United States Patent [19]

Savoca

[11] Patent Number: 4,792,684
[45] Date of Patent: Dec. 20, 1988

[54] DUAL FIELD HORIZON SCANNER

[75] Inventor: Robert C. Savoca, Ridgefield, Conn.

[73] Assignee: Barnes Engineering Company, Shelton, Conn.

[21] Appl. No.: 31,435

[22] Filed: Mar. 26, 1987

[51] Int. Cl.$^4$ .................................. G01J 5/08
[52] U.S. Cl. .................... 250/347; 250/342; 250/353; 356/152
[58] Field of Search ............ 250/353, 351, 347, 342; 356/141, 152; 244/3.16, 171; 364/459, 434

[56] References Cited

U.S. PATENT DOCUMENTS

| | | | |
|---|---|---|---|
| 3,020,407 | 2/1962 | Merlen | 250/347 |
| 3,418,478 | 12/1968 | Falbel | 250/202 |
| 3,793,518 | 2/1974 | Harper | 250/347 |
| 3,866,037 | 2/1975 | Simpson | 250/216 |
| 4,328,421 | 5/1982 | Falbel | 250/347 |

Primary Examiner—Janice A. Howell
Assistant Examiner—Constantine Hannaher
Attorney, Agent, or Firm—Parmelee, Bollinger & Bramblett

[57] ABSTRACT

Pitch and roll attitude information of an orbiting body is provided by sensing the discontinuity of optical radiation in a scan field of view between the reference body and outer space using a scanner which simultaneously scans two concentric conical paths through the field of view about the same axis of rotation of the orbiting body. The scanner comprises a scanning mirror split into two halves which are tilted through an angle with respect to each other and are also displaced in phase with respect to each other about the axis of rotation. The scanner may also be a prism having angled faces on opposite sides of the optical axis of the scanner which are also displaced in phase. Either scanner results in having a detector view two instantaneous fields of view simultaneously. An infrared detector receiving the radiation from these two fields of view produces signals which can be used to determine pitch and roll attidue as well as altitude on each scan which identifies four points around the horizon. This is all accomplished using but a single conical scanner.

11 Claims, 4 Drawing Sheets

RADIOMETRIC WAVEFORMS

DUAL FIELD HORIZON SCANNER

BACKGROUND OF THE INVENTION

This invention relates to a horizon sensor for providing pitch and roll attitude as well as altitude information of an orbiting body by scanning a line of discontinuity of optical radiation in a scan field of view and more particularly, in such a sensor having a scanner which simultaneously scans two concentric conical paths through the field of view about the same axis of rotation using the same scanner and detector to provide two axes as well as altitude information.

Horizon sensors are devices mounted in orbiting bodies such as satellites, missles, space probes, extremely high flying aircraft and the like which sense the horizon of a reference body and produce a signal which indicates orientation of the orbiting body with respect thereto. The attitude of the orbiting body is determined by its position with respect to three axes at right angles to each other, two of which are in a plane at right angles to a projected radius of the earth passing through the orbiting body and the third coincides with such radius. The plane in which the first two axes lie is parallel to the earth's horizon and are referred to as the pitch and roll axes with which the present invention deals.

In U.S. Pat. No. 3,020,407 which is assigned to the Assignee of the present invention, a horizon sensor is provided which utilizes the horizon representing a line of discontinuity between the earth's atmosphere and outer space which is characterized by large differences in infrared radiation. By scanning an infrared detector in a conical scan pattern across the horizon and deriving electrical output signals marking the line of discontinuity between cold outer space and the warm earth provides an electrical output from the detector with a large increase in signal as the line of thermal discontinuity is crossed. By generating reference pulses as the scan passes predetermined points in the orbit of the orbiting body the intervals between horizon crossings and the reference pulses may be used to produce an output signal providing attitude information of the orbiting body with respect to the horizon.

The optical configuration of a typical conical scan horizon sensor is shown in FIG. 1 in which an infrared detector views a small instantaneous field in space on the order of 1° diameter which scans through a large circle on a celestial sphere.

FIG. 2 shows the path of the sensor of FIG. 1 scanning across the earth along line AB having an instantaneous field of view crossing on and off the earth at points A and B, respectively. The detector in such a scan will produce an approximately rectangular wave shaped signal as shown in FIG. 3 having a width AB. The pitch and roll axis of the orbiting body or space craft are defined in FIG. 2. The pitch attitude of the space craft can be determined by the phase $\phi$ of the midpoint of the rectangular wave with respect to an internal reference position R. The roll attitude can be determined by the difference in the width of the rectangular wave shape AB and that generated by another conical scanner, CD displaced toward the opposite side of the earth. The problem of course, resides in the fact that two conical scanner sensor heads are required to provide this two axis information, which increases the weight, power and cost of the system as well as providing more moving parts and increasing the chance of malfunction.

SUMMARY

Accordingly, it is an object of this invention to provide a new and improved horizon sensor which employs a single conical scanner for providing two axes attitude information.

A further object of this invention is to provide a new and improved horizon sensor which provides pitch and roll attitude information as well as altitude utilizing a single conical scanner and a single detector.

Another object of this invention is to provide a new and improved horizon sensor which may employ either reflective or refractive optics in a single sensor head.

Still a further object of this invention is to provide a new and improved horizon sensor in those applications where the orbiting body is spin stabilized whereby the spin motion of the scanner is provided by the orbiting body.

In carrying out this invention in one illustrative embodiment thereof, a horizon sensor for providing pitch and roll attitude information of an orbiting body by sensing the discontinuity of optical radiation in a scan field of view between a reference body and outer space is provided by a scanning means for simultaneously scanning two concentric conical scan paths through the field of view about the same axis of rotation of the orbiting body using the same scanning means. Phase displacement means are provided in said scanning means for displacing the phase of the conical paths with respect to each other about the axis of rotation of the orbiting body and a common detector is provided having optical radiation applied thereto from the scanning means for both conical scans whereby the detector means views two instantaneous fields of view simultaneously thereby generating detector signals which may be used to determine pitch and roll attitude as well as altitude information.

Advantageously, the scanner which may be in the form of a scanning mirror split in two halves which are tilted with respect to each other and also displaced in phase with each other about the axis of rotation or a prism having angled faces with the same relationships as the split mirror may be used for scanning the optical paths, either when mounted on a rotating shaft or by using the spinning motion of the entire orbiting body.

BRIEF DESCRIPTION OF THE DRAWINGS

The invention, together with further objects, aspects, features and advantages thereof will be better understood from the following description taken in connection with the accompanying drawings.

DESCRIPTION OF THE PREFERRED EMBODIMENTS

Figure 5:
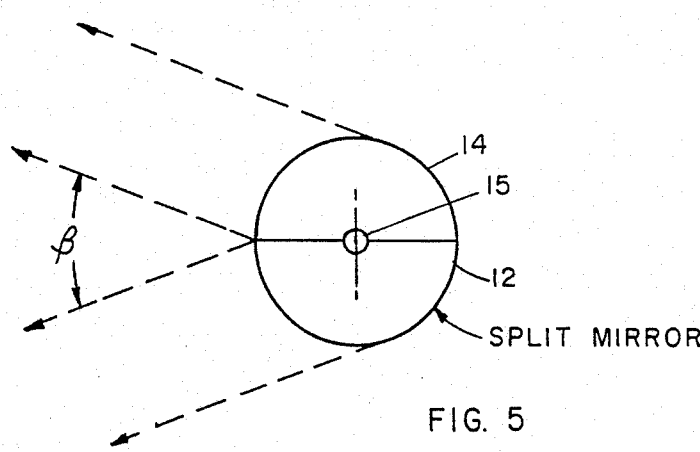
FIG. 5 is a top view of the dual field conical horizon scanner illustrated in FIG. 4.
Figure 4:
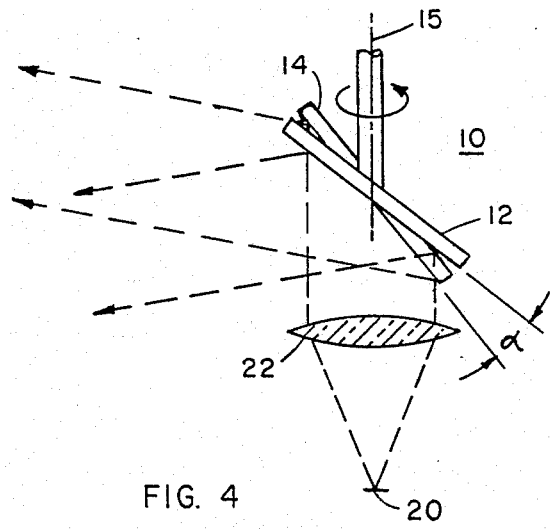
FIG. 4 is a side elevational view of a dual field conical horizon scanner in accordance with the present invention.

Referring now to FIGS. 4 and 5, a scanning mirror 10 is split into two halves 12 and 14 which are tilted through an angle $\alpha$ with respect to each other and are also displaced in phase with respect to each other by an angle $\beta$ about the axis of rotation 15. As a result, an infrared detector 20 will view through a lens 22 two instantaneous fields of view simultaneously indicated as #1 and #2 in FIG. 6. Scan lines 24 and 26 traversed by IFOV #1, and IFOV #2, respectively, are separated by an angle $2\alpha$ and are displaced with respect to each other in the scan direction by the angle $\beta$.

Figure 1:
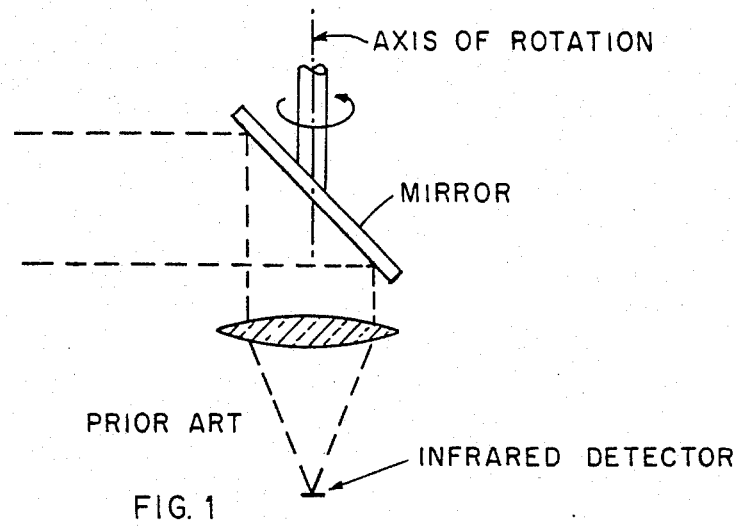
FIG. 1 is a diagrammatic illustration of a typical conical scan horizon sensor.
Figure 2:
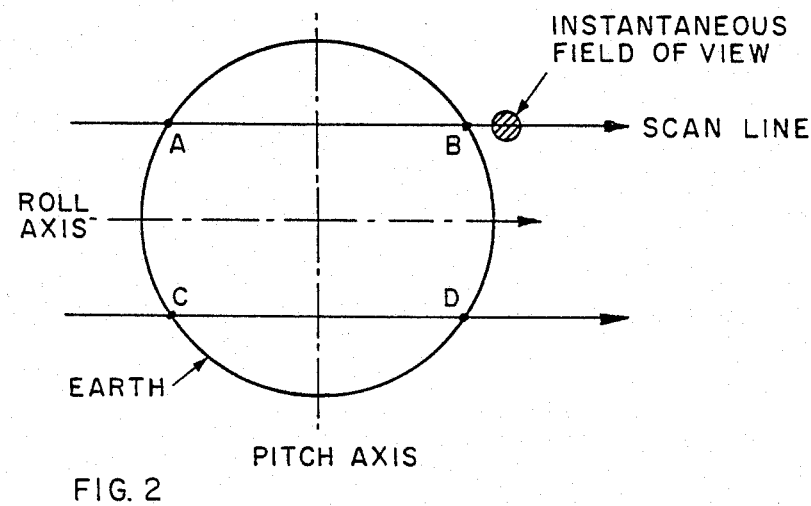
FIG. 2 is a diagrammatic illustration of a pitch and roll axis of a space craft orbiting the earth and being scanned by a sensor of the type shown in FIG. 1.
Figure 3:
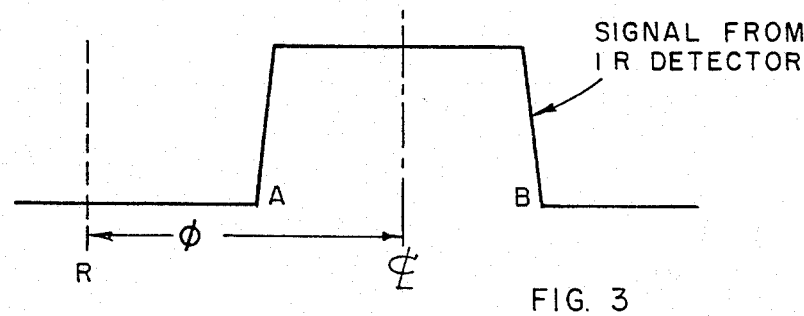
FIG. 3 illustrates the wave shape of a signal generated by a detector of the system of FIG. 1 scanning along a scan line illustrated in FIG. 2.
Figure 7:
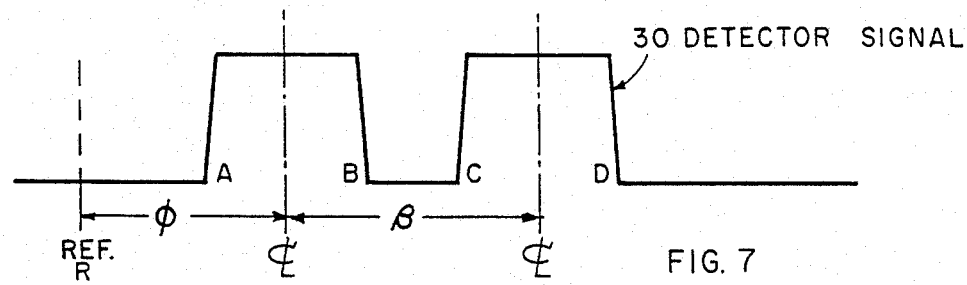
FIG. 7 is a wave shape of the signal generated by the detector of the scanner of FIG. 4 when following the scanning path illustrated in FIG. 6.

The detector signal 30 produced by the detector 20 ss shown in FIG. 2 and comprises two rectangular wave shapes AB and CD displaced in phase through the angle $\beta$. The pitch attitude is determined by the phase $\phi$ of the first rectangular wave shape with respect to a reference as was illustrated in FIG. 3, and the roll attitude is determined by the difference in wave shape widths AB−CD. The reference R illustrated in FIG. 7 is generated at a predetermined position of the conical scan mechanism which is related to the attitude of the spacecraft.

Figure 6:
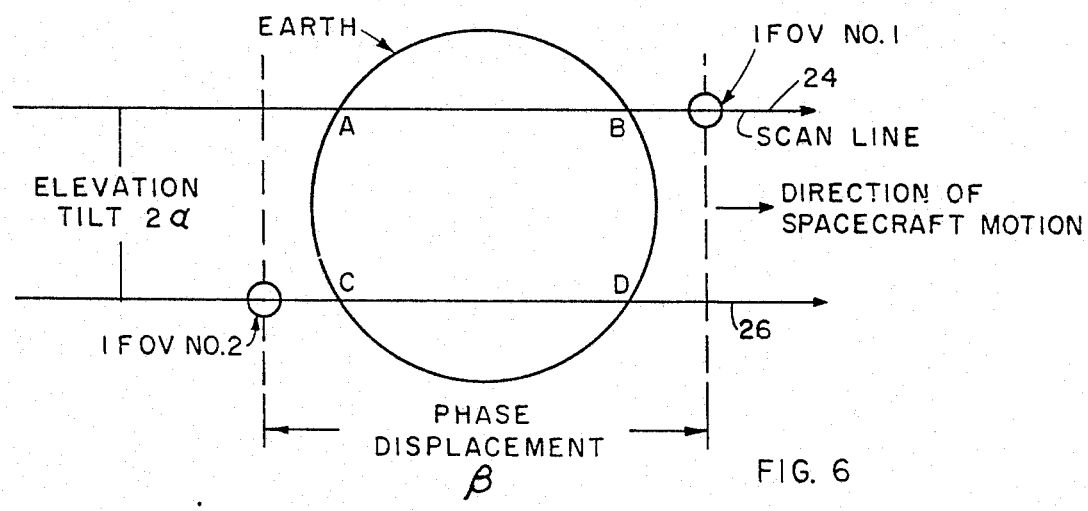
FIG. 6 is a diagrammatic illustration showing the path the horizon scanner of FIG. 4 follows in traversing the earth.

As will be clear from FIG. 6, each scan identifies four points, A, B, C, and D around the horizon. Since three points fully determine a circle, the earth's angular diameter and thus, altitude can be obtained from the sensor data in addition to the pitch and roll attitude information.

Figure 8:
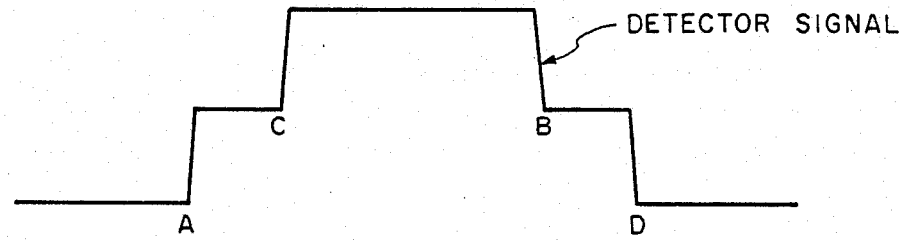
FIG. 8 illustrates the wave shape of a detector signal generated when the earth subtence is greater than the phase displacement between the fields of the split optical system illustrated in FIG. 5.

In FIG. 6, the diameter of the earth is shown to be less than the phase displacement $\beta$ between the instantaneous fields of the view of the optical elements. However, this is not necessary and FIG. 8 illustrates the type of wave shape that results when the earth's subtence is greater than the phase displacement between the instantaneous fields of view provided by the scanner 10. The horizon cross-overs A, B, C and D, can still be recognized by electronic logic even though intermingled since cross-over A is always the first step up, cross-over B the first step down, cross over C the second step up, and cross-over D the second step down.

Figure 9:
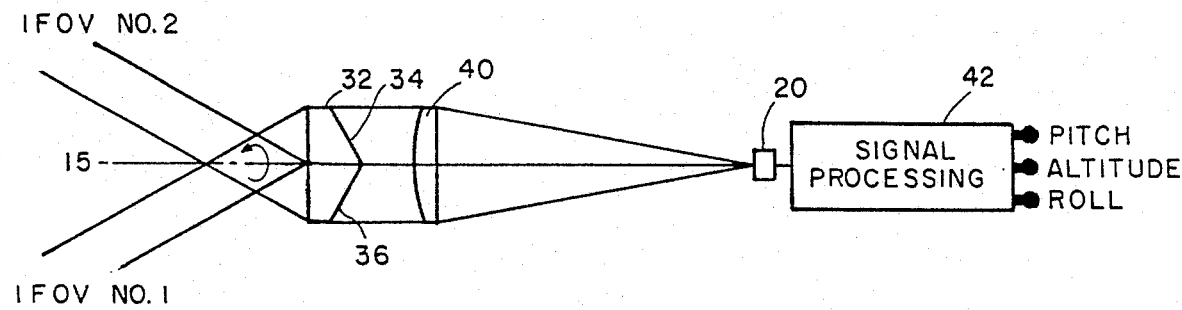
FIG. 9 is a diagram in which the split mirror is replaced with a prism which provides the same dual concentric conical scan patterns in accordance with the present invention.

FIG. 9 illustrates an alternative embodiment in which the concentric conical scanner in accordance with the present invention utilizes a prism 32 having angled faces 34 and 36 for producing instantaneous field of view #1 and instantaneous field of view #2, respectively, for the detector 20. A lens 40 is interposed between the prism 32 and the detector 40 for imaging the fields of view from the scanner onto the detector 40. The prism 32 performs the same function as the split mirror 10 in the embodiment of FIG. 4 in providing split concentric fields which fields may be varied by changing the angles of the faces 34 and 36 of the prism 32 with respect to each other. Also illustrated in FIG. 9 is the signal processing 42 to which the signals from the detector 20 are fed for providing the pitch, roll and attitude outputs as desired. The signal processing is conventional and the details thereof form no part of the present invention. The concentric conical scanner embodiment of FIG. 9 using the prism scanner is preferable for low attitudes since a scan circle of smaller radius is desirable which is difficult to obtain with mirrors. The split mirror scanner of FIG. 4 is better for synchronous and higher altitude applications using reflective rather than refractive optics.

Figure 10:
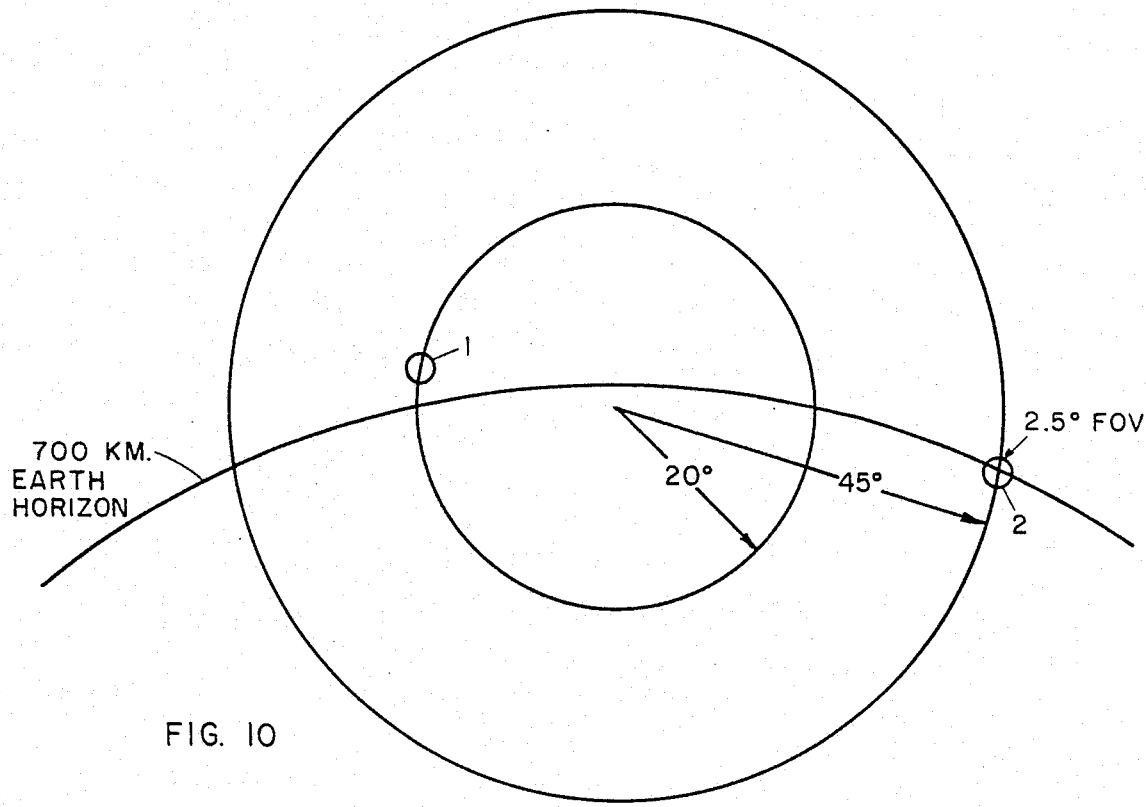
FIG. 10 illustrates the scan paths for the concentric conical scanner in accordance with the present invention for a set of given angles between the split optical elements.
Figure 11:
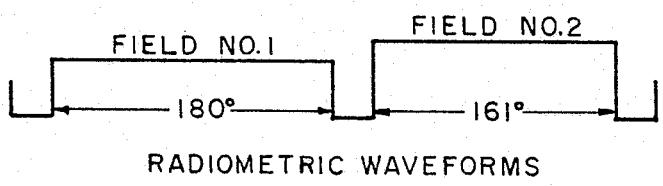
FIG. 11 shows a radiometric wave form of a signal produced by a detector in accordance with the scan path shown in FIG. 10.

FIG. 10 illustrates a practical example of the scan paths for the concentric conical scanners disclosed in the embodiments of FIGS. 4 and 9, with the concentric fields 180° out of phase and the split mirror or split prism having angles of 45° and 20°. FIG. 11 shows the radiometric wave form generated on a detector traversing the conical scan paths illustrated in FIG. 10. The illustrative example has a field of view of 2.5° and is positioned in an orbiting space craft 700 kms. above the earth.

The present invention thus provides a self contained two axes single head scanner which provide no alignment errors and may provide an inherent geometric improvement in scanning and also may reduce radiance errors. Even with the sun in the field which may eliminate one cross-over point, three points are still available on each scan cycle for providing the attitude and altitude information required. The improvement in geometry and a possible reduction in radiance errors is based on the small cone angles utilized by the system and the fact that they are concentric. The scans are also performed at the same time about the same axis producing no alignment errors. The system is adaptable when using either the prism or reflective optics for a wide range of altitudes.

Since some space craft are spin stabilized, in such cases the scanning action produced by the rotating mirror or prism can be accomplished by the spin motion of the entire satellite. The two fields of view reproduced by a stationary split mirror or prism of the type shown in FIGS. 4 and 9, respectively, oriented with the satellite spin axis being the same as axis 15 are the same fields provided by using a rotating shaft as illustrated in FIG. 4.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A horizon sensor for providing pitch and roll attitude information of an orbiting body by sensing the discontinuity of optical radiation in a scanned field of view between a reference body and outer space from a single conical scanner comprising:

scanning means for simultaneously scanning two concentric conical paths through said field of view about the same axis of rotation of the orbiting body using the same scanning means, phase displacement means in said scanning means for displacing the phase of said conical paths with respect to each other about the axis of rotation of said orbiting body, and a common detector means having optical radiation applied thereto from said scanning means such that said detector means views two instantaneous fields of view simultaneously so as to generate detector signals used to determined pitch and roll attitude information.

2. The horizon sensor as claimed in claim 1, wherein said scanning means includes a scanning mirror split into two halves which are tilted with respect to each other.

3. The horizon sensor as claimed in claim 2, wherein said displacement means comprises the split halves of said scanning mirror being displaced with respect to each other by a predetermined angle about the axis of rotation.

4. The horizon sensor as claimed in claim 3, wherein said predetermined angle is 180°.

5. The horizon sensor as claimed in claim 2, wherein said scanning mirror is rotated by the spin action of the orbiting body.

6. The horizon sensor as claimed in claim 1, wherein said scanning means includes a prism having different angled faces on opposite sides of the optical axis of said horizon sensor for providing the two concentric conical scan paths in accordance with the sizes of the angle on the different faces.

7. The horizon sensor as claimed in claim 6, wherein the different angled faces of said prism are displaced with respect to each other about the axis of rotation of said prism for displacing the phase of said two concentric conical scans.

8. The horizon sensor as claimed in claim 7, wherein said angled faces of said prism are displaced 180° with respect to each other.

9. The horizon sensor as claimed in claim 7, wherein said prism is rotated by the spin action of said orbiting body.

10. The method of determining the orientation of an orbiting body by scanning the discontinuity in optical radiation in a field of view between a reference body and outer space from two simultaneous scans using the same scanner comprising:

simultaneously conducting two concentric conical scans of said field of view about the same axis of rotation of the orbiting body with the same scanner, displacing the phase of the scans with respect to each other about the axis of rotation, simultaneously applying the optical radiation from said two conical concentric scans to a common detector, and determining the orientation of said orbiting body with respect to said reference body using signals generated by optical radiation applied to said common detector by said simultaneous scans.

11. The method as claimed in claim 10, wherein the step of simultaneously conducting two concentric conical scans is accomllished using the spin motion of a spin stabilized orbiting body.

* * * * *